July 18, 1967 R. S. SOLOFF 3,331,719

METHOD OF SPLICING FLEXIBLE THERMOPLASTIC TAPE USING ADHESIVE TAPE AND SONIC ENERGY

Filed May 8, 1964

INVENTOR.
Robert S. Soloff
BY
Blair, Buckles, Cesari & St. Onge
ATTORNEYS.

United States Patent Office 3,331,719

Patented July 18, 1967

3,331,719

METHOD OF SPLICING FLEXIBLE THERMOPLASTIC TAPE USING ADHESIVE TAPE AND SONIC ENERGY

Robert S. Soloff, Stamford, Conn., assignor, by mesne assignments, to Branson Instruments, Incorporated, a corporation of Delaware Filed May 8, 1964, Ser. No. 366,178
1 Claim. (Cl. 156—73)

This invention relates to sonics and particularly to a method of joining together two pieces of flexible material. More particularly, it relates to a method of sonically splicing tape.

Flexible materials and tapes have been joined in the past by several methods.

When splicing magnetic recording tape, for example, the ends of the tape pieces to be joined are preferably cut on a bias and the cut ends butted together. A piece of specially prepared pressure sensitive tape is then laid over and pressed against the butted ends to hold them in their butted relationship. This tape is applied to the smooth or non-magnetic side of the tape to avoid interfering with the recording or reading of information on the tape. This method is unsatisfactory in that the bias cut across the tape creates synchronization problems when several recording tracks on the tape are cut at different longitudinal locations along the tape. To avoid these synchronization problems, multichannel recording tape is cut at right angles to its length and the piece of specially prepared pressure sensitive tape applied as described above. While this avoids the synchronization problem, the transversely cut ends of the tape tend to catch on the sharp edges of the recording heads as the tape is moved past the latter. Also, the pressure sensitive tape adds thickness to the recording tape. This additional thickness often interferes with the smooth passage of the tape through the various recording and reading components. Further, the pressure sensitive tape alters the flexibility of the recording tape in the vicinity of the splice, making it difficult for the recording tape to follow tortuous paths and complicating the problem of selectively controlling the tension of the tape to control the force with which the tape is pressed against the recording head.

When splicing motion picture films, the ends of the pieces to be joined are trimmed, adhesive is applied to a surface adjacent the end of one of the pieces, and the end of the other piece is lapped over the first piece so that the lapped ends are bonded together by the adhesive. The use of adhesive is inherently messy, however, and the resulting bond is often initially weak or, even if initially satisfactory, becomes brittle and weak with age. Also, escape of the adhesive material from the bonding zone, spoils the appearance, if not the usefulness, of the film. Adhesive splicing is also slow, because of the long drying time required for the adhesive to set. It is also dangerous when conventional highly flammable and toxic adhesives are used.

In an attempt to avoid the above noted problems and shortcomings of the prior art splicing methods, it has been proposed to splice flexible materials and tapes with sonic energy. According to this method, two tape pieces are brought together to lap an end of one over an end of the other. Sonic energy is thereafter introduced into one of the pieces. The sonic energy is transmitted through that piece to the interface of the lapped ends. This produces relative vibratory movement of the lapped ends which melts the tape material at the interface and causes it to flow to form a weld joining the strips. While this method has been proven generally satisfactory in some applications, it has the disadvantage that the tape tends to scar or burn at the surface where the sonic energy is introduced, thereby detracting from the appearance, if not the usefulness, of the tape. Also, the tape material at the sealing interface tends to crystallize or craze, thereby weakening the seal, and, in the case of transparent tape, producing an undesirable opaque area in the tape. Furthermore, it is extremely difficult to maintain the two tape pieces in their desired lapped positions during the sealing operation so that the sonic sealing method has not readily adapted itself to high speed operation.

Other joining or splicing methods which have been proposed from time to time present similar difficulties and shortcomings.

Accordingly, it is an object of the present invention to provide a method of joining together two flexible pieces that will overcome all of the above noted disadvantages and shortcoming of the prior art methods.

More specifically, it is an object to provide such a method that is quicker than the prior art methods.

A further object is to provide such a method that gives a stronger and more uniform bond than the prior art methods.

A further object is to provide such a method that is neater than the prior art methods.

A more specific object is to provide an improved method of splicing tape.

Another object is to provide a method of sonic splicing that will produce a stronger and more uniform seal than the prior art sonic splicing methods.

A further object is to provide a method of sonic splicing that will produce an effective splice without derogating the appearance or usefulness of the spliced product.

Still another object of the invention is to provide a method of the above character for splicing magnetic recording tape.

Yet a further object of the invention is to provide a method of the above character for splicing magnetic recording tape without significantly affecting the physical dimensions and qualities of the tape at the splice.

A still further object of the invention is to provide a method of splicing flexible sheet material without significantly affecting the physical dimensions and qualities of the material at the splice.

Other objects of the invention will in part be obvious and will in part appear hereinafter.

The invention accordingly comprises the several steps and the relation of one or more of such steps with respect to each of the others thereof which will be exemplified in the method hereinafter disclosed, and the scope of the invention will be indicated in the claim.

For a fuller understanding of the nature and objects of the invention, reference should be had to the following detailed description taken in connection with the accompanying drawing in which.

Figure 1:
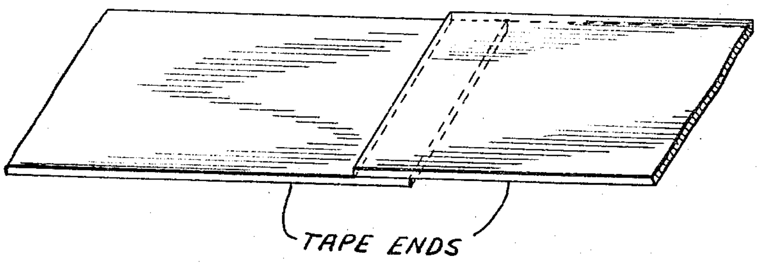
FIGURE 1 is a perspective view showing overlapping tape ends to be ultrasonically spliced together.

I have discovered that the above noted difficulties and shortcomings of the prior art sonic joining or splicing methods may be overcome by bonding a single piece of flexible material to both of the members to be joined in superposed relation at the sealing interface. This single piece is bonded to the members prior to the introduction of the sonic energy into the members. It is removed from the joined members after the sonic energy has been introduced and the thermoplastic material at the interface has hardened to form a weld. This single piece of bonding material may take many forms. One form that I have found particularly advantageous is cellophane adhesive tape.

Specifically, I have found that a piece of cellophane adhesive tape when laid over and along the sealing interface of the two members to be joined and pressed or smoothed into firm adhesive engagement with these members, holds the two members in their desired contiguous relation at the sealing interface during the sealing operation and is readily peeled off of the joined members following the sealing operation. The use of cellophane adhesive tape has been found to provide a smoother, more uniform and, hence, stronger bond with substantially no crazing or crystallizing at the sealing interface.

I have also found that, where the members to be joined are of a material which is likely to be burned or scarred by the introduction of sonic energy, the sonic energy may be introduced into the piece of cellophane tape and transmitted through that piece to the sealing interface of the members to be joined, thereby preventing scarring or bubbling of the members themselves.

For example, I have employed the method of the invention to sonically join sheets of polyethylene. The sheets used were approximately three inches wide and were of varying lengths and thicknesses. In one example, two sheets .010 inch thick were overlapped along their three inch sides by a distance of approximately ⅛". A strip of Scotch brand cellophane adhesive tape was laid along the seam formed by the overlap and pressed smoothly into adhesive engagement with the two sheets. Ultrasonic energy was then introduced into one of the sheets to cause the sheets to undergo relative vibratory movement at the interface between the lapped edge portions of the two sheets so as to melt the thermoplastic material at the interface and cause it to flow. Upon hardening of the thermoplastic material to form a weld, the piece of Scotch tape was peeled off. The piece of Scotch tape did not seal to the polyethylene sheets, presumably because it was prevented from vibrating relative to these sheets by its adhesive engagement therewith. The Scotch tape left no residue on the surface of the sheets. The seal formed at the interface of the lapped edges was strong and uniform and devoid of the crazed or crystallized effects frequently produced by prior art sonic sealing methods.

In another example, two other 3" wide polyethylene sheets of .020 inch thickness were sonically joined in the manner described with the same advantageous results.

In the above examples, the sonic energy was introduced by feeding the Scotch tape and polyethylene sheet assembly into a gap defined between a suitable base or anvil surface and the small area tip of a vertically disposed concentrating horn of a high-power sonic source.

The gap between the horn tip and the anvil was set to approximately the combined thickness of one polyethylene sheet and the Scotch tape. The lapped seam was fed progressively beneath the vibratory horn tip in much the same manner as cloth is fed progressively beneath the vertically reciprocating needle of a sewing machine. In passing beneath the horn tip, the assembly was progressively beaten down by the horn tip to approximately the width of the gap between the horn tip and the base surface. After peeling off of the Scotch tape, the resulting composite sheet had a uniform thickness, even at the seam, approximately equal to that of one of the polyethylene sheets. No bulging of the sheets was observed at the ends of the seam; that is, the width of the sheets at the seam was not noticeably increased even though the lapped edges of the sheets were beaten down to a fraction of their original thickness.

A sonic power source that has been found effective for practicing the invention is disclosed in the copending United States patent application of Stanley E. Jacke et al. entitled "Sonic Disperser," Ser. No. 125,568, filed July 20, 1961. A sonic energy source of the form disclosed in the above-identified application was found to give satisfactory results in the above examples when operated at a frequency of 20,000 cycles per second and a power of 75 watts. The horn used was a one-half inch step horn with a $\frac{1}{32}$ inch radius spherical tip.

Figure 2:
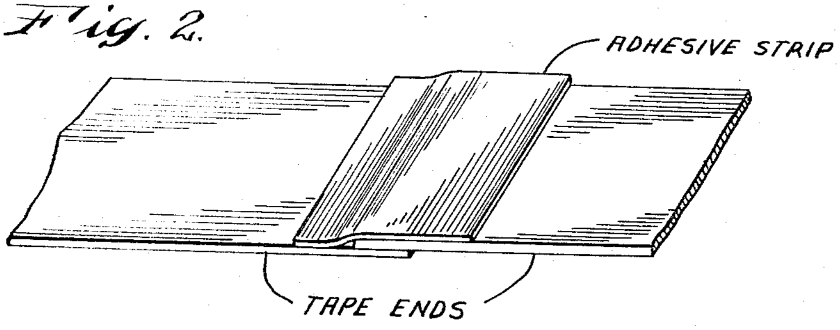
FIGURE 2 is a perspective view showing the application of an adhesive strip to the overlapped tape ends prior to ultrasonic splicing.
Figure 3:
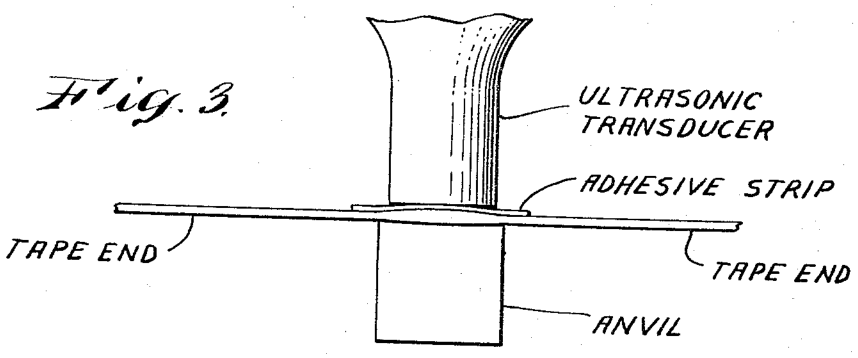
FIGURE 3 is a side elevational view showing the application of ultrasonic energy to the assemblage of FIGURE 2 with the adhesive strip serving as the coupling medium.
Figure 4:
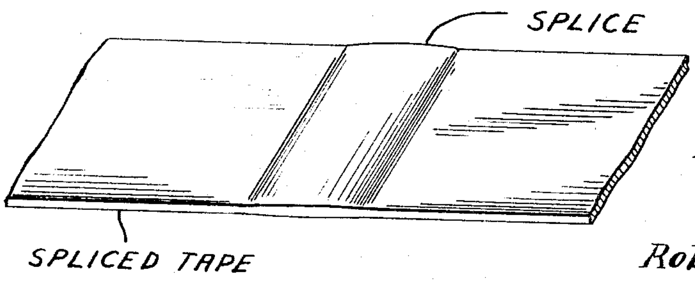
FIGURE 4 is a perspective view of the ultrasonically spliced tape ends with the adhesive strip removed.

In another example shown in FIGURES 1 through 4 of the drawing, I have employed the method of the invention to sonically splice two strips of magnetic recording tape formed of a polyester material sold under the trademark "Mylar." One of the Mylar strips was .001 inch thick, and the other .0015 inch thick, and both were three-quarters of an inch wide. The strips were lapped at their ends by a distance of approximately $\frac{3}{32}$ of an inch (FIGURE 1). A strip of Scotch brand cellophane adhesive tape was laid along the seam formed by the overlap and pressed smoothly into adhesive engagement with the ends of the two strips (FIGURE 2). The piece of adhesive tape was applied to the non-magnetic sides of the tape strips. Ultrasonic energy was then transmitted to the interface of the lapped ends of the tape strips by passing the tape strip and the adhesive strip assembly progressively beneath the vibrating small area tip of the horn of a high-power sonic energy source (FIGURE 3) of the type disclosed in the above-identified copending application. As in the previous examples, the gap between the horn tip and the anvil or base surface was set at a magnitude to produce, upon peeling off of the Scotch tape, a seam having a thickness approximately equal to that of the individual strips of recording tape (FIGURE 4). Again, the tape strips did not bulge at the ends of the seam despite the reduction in their width at the seam. In this example, the sonic power source was again operated at a frequency of approximately 20,000 cycles per second and a power of 75 watts. The horn employed was a one-half inch step horn with a $\frac{1}{16}$ inch radius spherical tip.

I have also employed the method of the invention to splice the two ends of a Jacquard belt to form a continuous closed belt. The belt employed was formed of a six inch wide strip of Mylar material. In this example, the two ends of the belt were overlapped by a distance of one eighth of an inch. A strip of Scotch brand cellophane adhesive tape was laid along the six inch seam formed at the overlapped ends of the belt. The assembly of the lapped ends and adhesive tape was passed progressively beneath the small area tip of the horn of the previously described high-power sonic source. The sonic source was again operated at a frequency of approximately 20,000 cycles per second and at a power of 75 watts. The horn employed was a one-half inch step horn with a ⅛ inch radius spherical tip. The gap was again set to give a final seam thickness upon removal of the Scotch tape approximating that of the Mylar tape, and the Mylar tape again did not bulge at the ends of the seam.

In a similar example, a Mylar Jacquard belt, having a width of ten inches, was sonically spliced by the method of the invention.

In another example, two strips of Mylar tape having a thickness of .005 inch and a width of six inches were sonically spliced together. The strips each had transverse decorative stripes spaced therealong at intervals of approximately one-sixteenth of an inch. When spliced together according to the methods of the prior art, the tape material at the interface of the lapped ends crazed or crystallized to such an extent that the transverse stripes in the vicinity of the seal were obscured. When spliced according to the method of the invention, by applying a strip of Scotch tape along the overlapped seam prior to the introduction of the sonic energy, a substantially transparent seal was formed at the interface of the lapped ends. The transverse stripes remained clear and distinct even in the area of the seal. In this example, a sonic energy source of the type described above was employed, and was operated at a frequency of approximately 20,000 cycles per second and a power of approximately 47 watts. The horn used was a one-half inch step horn with a cylindrical tip.

In each of the above examples, the lapped pieces to be joined were fed beneath the tip of the concentrating horn with the piece of Scotch tape overlying the overlapped seam. The tip contacted and introduced the sonic energy into the Scotch tape rather than the members to be joined. Thereby the possibility of burning or scarring one of the members was avoided. In other examples, where the material of the members being joined was not subject to scarring or where scarring was not undesirable, the lapped member and Scotch tape assembly was passed beneath the tip of the horn with the Scotch tape underlying the members so that the tip contacted one of the members to couple the sonic energy into it directly.

In still other examples, two pieces of Scotch tape were employed, one overlying and one underlying the lapped seam as the assembly was passed beneath the concentrating horn.

It will thus be seen that the objects set forth above, among those made apparent from the preceding description, are efficiently attained. Specifically, it will be seen that the invention provides a method of joining together two flexible pieces that gives a stronger and more uniform bond than the prior art methods, and produces such a bond without spoiling the apperance and usefulness of the joined or spliced product.

Since certain changes may be made in carrying out the above method without departing from the scope of the invention, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A method of splicing flexible tape of thermoplastic material comprising, in combination, the steps of:

(A) bringing together the ends of the two tape portions to be spliced to place a surface of an end of one portion against a surface of an end of the other portion;

(B) laying a piece of pressure sensitive adhesive tape over said ends;

(C) pressing said adhesive tape against said ends to join them and hold said surfaces together;

(D) introducing sonic energy into said piece of adhesive tape so as to transmit said energy through said piece to the interface of said surfaces to melt the thermoplastic material at the interface and cause it to flow together to form a weld joining said flexible tape pieces; and (E) peeling said adhesive tape from said joined tape portions.

References Cited

UNITED STATES PATENTS

| | | | |
|---|---|---|---|
| 2,441,940 | 5/1948 | Rohdin | 156—289 |
| 2,473,784 | 6/1949 | Carlin et al. | 156—304 |
| 3,022,814 | 2/1962 | Bodine | 156—73 |
| 3,251,912 | 5/1966 | Fish | 156—304 |

OTHER REFERENCES

Alles, F. F.: Journal of the Society of Motion Picture and Television Engineers, December 1961.

EARL M. BERGERT, *Primary Examiner.*

DOUGLAS J. DRUMMOND, *Examiner.*